United States Patent
Kim et al.

(10) Patent No.: US 10,464,405 B2
(45) Date of Patent: Nov. 5, 2019

(54) AUTOMATIC INSTALLATION SYSTEM OF HIGH VOLTAGE BATTERY FOR ELECTRIC VEHICLE

(71) Applicant: KIA MOTORS CORPORATION, Seoul (KR)

(72) Inventors: Seong Woo Kim, Gwangju (KR); Yong Cheol Kim, Gwangju (KR); Tae Joon Kang, Yeosu-si (KR)

(73) Assignee: KIA MOTORS CORPORATION, Seoul (KR)

( * ) Notice: Subject to any disclaimer, the term of this patent is extended or adjusted under 35 U.S.C. 154(b) by 558 days.

(21) Appl. No.: 14/823,812

(22) Filed: Aug. 11, 2015

(65) Prior Publication Data
US 2016/0325611 A1    Nov. 10, 2016

(30) Foreign Application Priority Data

May 6, 2015    (KR) .................. 10-2015-0062925

(51) Int. Cl.
*B62D 65/02*    (2006.01)
*B60K 1/04*    (2019.01)
(Continued)

(52) U.S. Cl.
CPC .............. *B60K 1/04* (2013.01); *B23P 19/10* (2013.01); *B23P 21/004* (2013.01); *B60L 50/66* (2019.02);
(Continued)

(58) Field of Classification Search
CPC ..... B60K 1/04; B60K 2001/0405; B60S 5/06; B62D 65/02; B23P 21/004; B23P 19/10;
(Continued)

(56) References Cited

U.S. PATENT DOCUMENTS 5,465,868 A * 11/1995 Bonomi .................. B21J 15/32
                                                                221/156
5,711,648 A    1/1998 Hammerslag
(Continued)

FOREIGN PATENT DOCUMENTS

CN        1239927 A    12/1999
CN    102267437 A    12/2011
(Continued)

OTHER PUBLICATIONS

Chinese Office Action dated Aug. 10, 2018 from corresponding Chinese Application No. 201510557902.X, 12 pp.

*Primary Examiner* — Sarang Afzali
*Assistant Examiner* — Ruth G Hidalgo-Hernandez
(74) *Attorney, Agent, or Firm* — Brinks Gilson & Lione

(57) ABSTRACT

The present disclosure provides an automatic installation system, a device, and a method, of a high voltage battery for a vehicle. In particular, the automatic installation device of a high voltage battery for a vehicle includes a hanger part to hang a frame for the vehicle; and an automatic installation part provided under the hanger part to automatically center the high voltage battery on the frame for the vehicle and then install the high voltage battery, whereby it is possible to improve workability by replacing a manual work process with the automatic installing process of installing the high voltage battery on the frame for the vehicle and thus save costs by improving accuracy and safety and reducing labor costs thanks to the implementation of automation.

15 Claims, 7 Drawing Sheets

(51) Int. Cl.
    *B23P 19/10* (2006.01)
    *B23P 21/00* (2006.01)
    *B60L 50/60* (2019.01)

(52) U.S. Cl.
    CPC .......... *B62D 65/02* (2013.01); *B23P 2700/50* (2013.01); *B60K 2001/0405* (2013.01); *Y02T 10/705* (2013.01); *Y02T 10/7005* (2013.01); *Y10T 29/53543* (2015.01)

(58) Field of Classification Search
    CPC . B23P 2700/50; B60L 11/18; Y10T 29/53543
    See application file for complete search history.

(56) References Cited

U.S. PATENT DOCUMENTS 6,109,424 A * 8/2000 Doan ..................... B62D 65/02
                                                        198/468.8
6,427,321 B2 * 8/2002 Fedato ................... B62D 65/18
                                                          29/281.5
2009/0058355 A1 * 3/2009 Meyer ................. B60L 11/1822
                                                          320/104

FOREIGN PATENT DOCUMENTS

| | | |
|---|---|---|
| JP | H06-001302 Y2 | 1/1994 |
| JP | H06-190662 A | 7/1994 |
| JP | H07172190 A | 7/1995 |
| JP | H09-047880 A | 2/1997 |
| JP | 2012040935 A | 3/2012 |
| JP | 2013001335 A | 1/2013 |
| JP | 2013119288 A | 6/2013 |
| KR | 10-0862396 B1 | 10/2008 |
| KR | 10-2012-0056462 | 6/2012 |
| KR | 101241166 B1 | 3/2013 |
| KR | 10-2004-0005129 | 1/2014 |

* cited by examiner

US 10,464,405 B2

AUTOMATIC INSTALLATION SYSTEM OF HIGH VOLTAGE BATTERY FOR ELECTRIC VEHICLE

CROSS-REFERENCE TO RELATED APPLICATION

This application claims the benefit of Korean Patent Application No. 10-2015-0062925, filed on May 6, 2015, which is hereby incorporated by reference herein in its entirety.

FIELD

The present disclosure relates to an automatic installation system of a high voltage battery for an electric vehicle, a device, and a method.

BACKGROUND

The statements in this section merely provide background information related to the present disclosure and may not constitute prior art.

Generally, to install a battery in a vehicle, the vehicle typically uses a method for utilizing a space of an engine room or a trunk room, and the like. However, in order for the electric vehicle to store much more energy, a volume of the battery is increased and therefore it is difficult to install the battery in the engine room or the trunk room.

Therefore, in the case of the existing electric vehicle, the battery is often installed on a lower portion of the vehicle, that is, a lower portion of an underfloor.

As described above, the battery is fixedly installed to the lower portion of the vehicle by fastening members such as a bolt and a nut in the state in which the battery is lifted toward the lower portion of the vehicle and is aligned in a plurality of mounting holes provided in a vehicle body. In this case, since the weight and the volume of the battery are increased, a worker is hard to set centers of the mounting holes by raising the battery to align the mounting holes manually, thereby causing a problem of the reduction in workability.

SUMMARY

The present disclosure provides an automatic installation system of a high voltage battery for an electric vehicle, a device, and a method capable of automatically installing the high voltage battery on a frame for the electric vehicle.

According to one form of the present disclosure, an automatic installation system of a high voltage battery for an electric vehicle includes: a conveyor including a traveling rail formed in a length direction and having a circulating structure to convey the high voltage battery; a hanger part provided over the traveling rail to hang the frame for the electric vehicle forming an appearance of the electric vehicle; and an automatic installation part configured to move along the traveling rail and provided under the hanger part to automatically center the high voltage battery conveyed from the conveyor on the frame for the electric vehicle and then install the high voltage battery on the frame for the electric vehicle.

The automatic installation part may include: an installation carter configured to move along the traveling rail; and a base arranged over the installation carter and provided with the high voltage battery.

According to another form of the present disclosure, an automatic installation device of a high voltage battery for an electric vehicle includes: a hanger part configured to hang a frame for the electric vehicle; and an automatic installation part provided under the hanger part to automatically center the high voltage battery on the frame for the electric vehicle and then install the high voltage battery.

The automatic installation part may include: an installation carter configured to move along the traveling rail; a base provided with the high voltage battery; and a lifter provided in the installation carter and connected to the base to lift the base.

The traveling rail may be connected to a conveyor conveying the high voltage battery to the base provided with the high voltage battery.

The automatic installation part may further include a centering part configured to set a position at which the high voltage battery is fixed to the frame for the electric vehicle.

The automatic installation part may further include a fastening part by which the high voltage battery is automatically installed on the frame for the electric vehicle.

The fastening part may include: a feeding part configured to supply a bolt to install the high voltage battery on the frame for the electric vehicle; and a plurality of bolt runner parts configured to be connected to the feeding part and have ends positioned at the base to automatically install the high voltage battery on the frame for the electric vehicle.

The centering part may include: a centering cylinder configured to set fixed positions for left and right directions of the high voltage battery and the frame for the electric vehicle; and a centering clamp configured to set fixed positions for front and back directions of the high voltage battery and the frame for the electric vehicle.

The feeding part may include: a hopper configured to store a bolt; a bowl provided at an end of the hopper to align the stored bolt; and a transfer device provided in the bowl to convey the aligned bolt.

The transfer device may include a supply hose supplying the bolt to the bolt runner part.

The bolt runner part may include a feeder preparing for the fastening by the bolt supplied through the supply hose.

The traveling rail and the conveyor may be connected to each other in a ⊓-letter shape.

The conveyor and the traveling rail may be circulated.

According to another exemplary embodiment of the present disclosure, an automatic installation device of a high voltage battery for an electric vehicle includes: a hanger part configured to hang a frame for the electric vehicle forming an appearance of the electric vehicle; an automatic installation part configured to move along a traveling rail and lift a base provided with the high voltage battery to fix and install the high voltage battery on the frame for the electric vehicle; a centering part to be provided in the automatic installation part and include a centering cylinder setting fixed positions for left and right directions of the high voltage battery and the frame for the electric vehicle and a centering clamp setting fixed position for front and back directions so as to set a position at which the high voltage battery is fixed to the frame for the electric vehicle; and a fastening part configured to include a feeding part configured to supply a bolt to install the high voltage battery on the frame for the electric vehicle, and a plurality of bolt runner parts configured to be connected to the feeding part and have ends positioned at the base to automatically install the high voltage battery on the frame for the electric vehicle.

According to another exemplary embodiment of the present disclosure, an automatic installation method of a high voltage battery for an electric vehicle to automatically install the high voltage battery on a frame for the electric vehicle, includes: a first step of coupling between a hanger part to which the frame for the electric vehicle is hanged and an automatic installation part; a second step of lifting a base provided with the high voltage battery by a lifter provided in the automatic installation part; a third step of setting a position at which the high voltage battery is fixed to the frame for the electric vehicle by a centering part provided in the automatic installation part; and a fourth step of automatically fastening the high voltage battery on the frame for the electric vehicle by a bolt through a bolt runner part of a fastening part provided in the automatic installation part after the setting of the fixed position in the third step.

The automatic installation method may further include: a fifth step of returning the bolt runner part after the fastening by the bolt in the fourth step; a sixth step of falling the lifter after the fifth step; and a seventh step of moving an installation carter provided with the base backward to complete an automatic installation and then positioning the installation carter at a regular position to supply the bolt to the bolt runner part so as to prepare for a subsequent process, after the sixth step.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
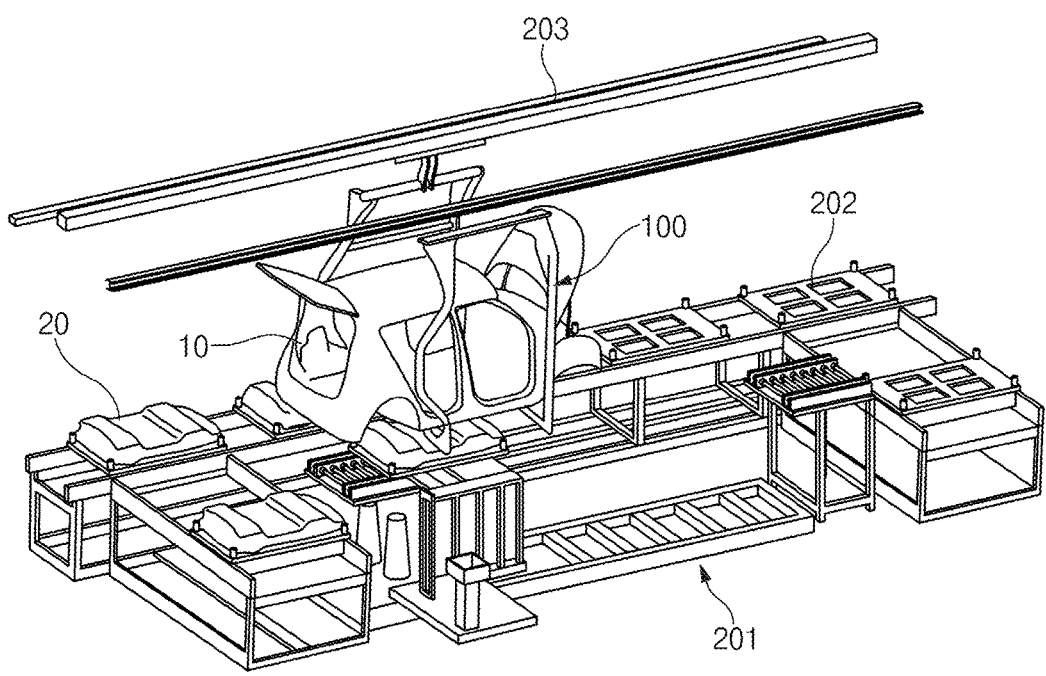
FIG. 1 is a diagram illustrating an automatic installation system of a high voltage battery for an electric vehicle and a device thereof according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As illustrated in FIGS. 1 to 4, an automatic installation system of a high voltage battery for an electric vehicle according to one form of the present disclosure includes a conveyor 202 conveying a high voltage battery 20, a hanger part 100 hanging a frame 10 for the electric vehicle, and an automatic installation part 200 automatically installing the high voltage battery 20 on the frame 10 for the electric vehicle.

The conveyor 202 includes a traveling rail 201 formed in a length direction and has a circulating structure to convey the high voltage battery 20.

The hanger part 100 is provided to move along a transfer rail 203 positioned over a production line to hang the frame 10 for the electric vehicle forming an appearance of the electric vehicle to the hanger part 100.

The automatic installation part 200 may move along the traveling rail 201 and is provided under the hanger part 100 to automatically center the high voltage battery 20 conveyed from the conveyor 202 on the frame 10 for the electric vehicle which is hanged in the hanger part 100 and then install the high voltage battery 20 on the frame 10 for the electric vehicle.

In this case, the automatic installation part 200 includes an installation carter 210 movably provided along the traveling rail 201 and a base 220 provided over the installation carter 210 and provided with the high voltage battery 20 which will be installed on the frame 10 for the electric vehicle.

As such, the present disclosure includes the traveling rail 201 and the conveyor 202 having the circulation structure, conveys the high voltage battery 20 conveyed along the conveyor 202 to the frame 10 for the electric vehicle hanged to the hanger part 100, uses the automatic installation part 200 to automatically align and install the high voltage battery 20 on the frame 10 for the electric vehicle, moves the frame 10 for the electric vehicle installed with the high voltage battery 20 to the subsequent process after the high voltage battery 20 is aligned and installed, and automatically performs a preparation to install the high voltage battery 20 on a new frame 10 for an electric vehicle, thereby improving the convenience of operation.

As illustrated in FIGS. 1 to 6, the automatic installation system of a high voltage battery for an electric vehicle according to the exemplary embodiment of the present disclosure includes the hanger part 100 hanging the frame 10 and the automatic installation part 200 provided under the hanger part 100 to automatically install the high voltage battery 20 on the frame 10 for the electric vehicle.

Figure 3:
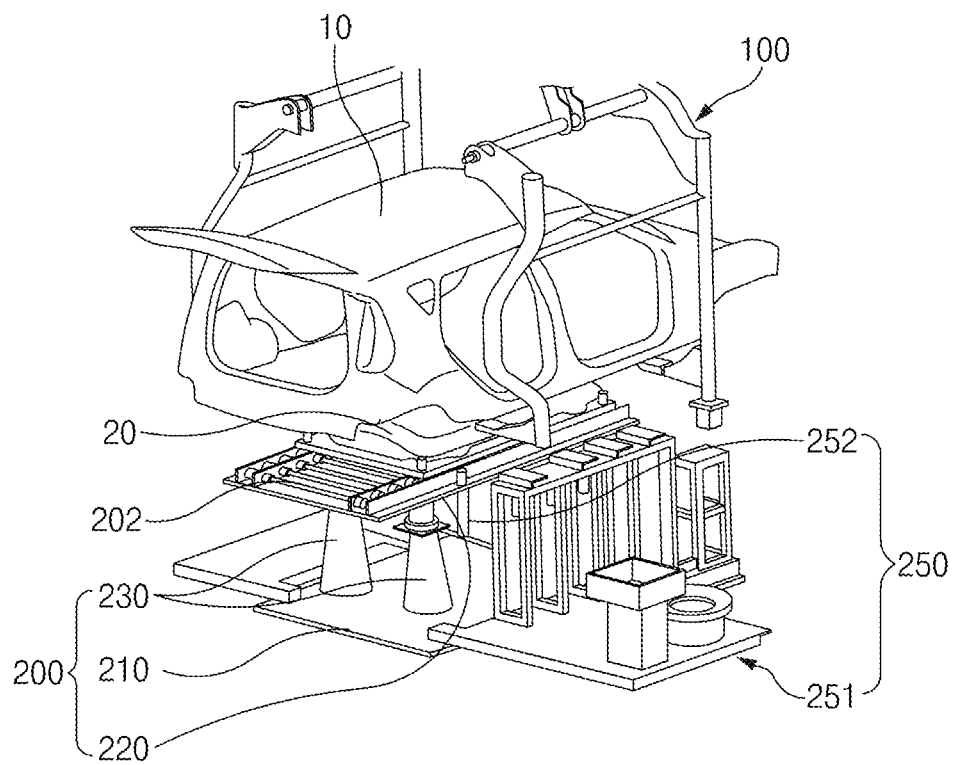
FIG. 3 is a diagram illustrating a hanger part and an automatic installation part of the automatic installation system of a high voltage battery for an electric vehicle and the device thereof according to the exemplary embodiment of the present disclosure.

As illustrated in FIGS. 1 and 3, the frame 10 for the vehicle is hanged to the hanger part 100.

In this configuration, the frame 10 is the frame 10 for the electric vehicle on which the high voltage battery 20 may be installed.

The hanger part 100 is movably provided along the transfer rail 203 which is positioned over the production line, thereby hanging the frame 10 for the electric vehicle to the hanger part 100 and conveying the frame 10.

Figure 2:
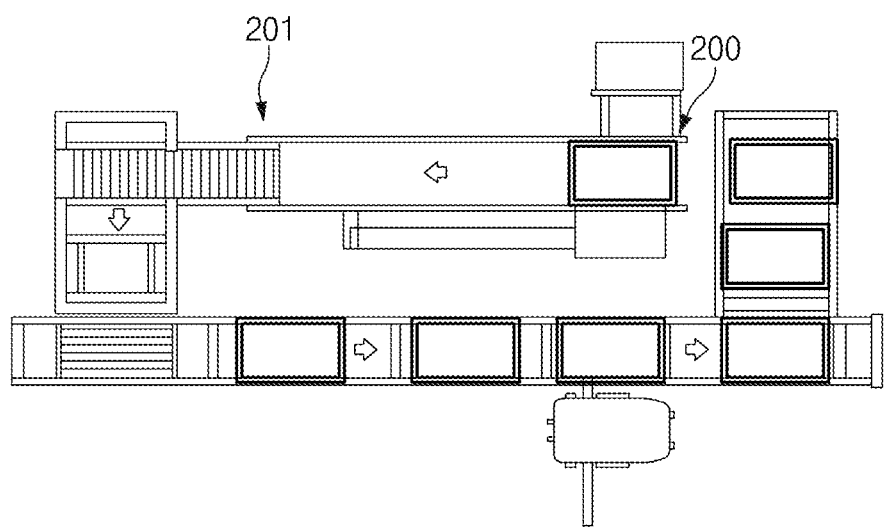
FIG. 2 is a plan view illustrating the automatic installation system of a high voltage battery for an electric vehicle and the device thereof according to the present disclosure.

As illustrated in FIGS. 1 to 3, the automatic installation part 200 is provided under the hanger part 100 to automatically center the high voltage battery 20 on the frame 10 for the electric vehicle hanged to the hanger part 100 and then install the high voltage battery 20.

In this case, the automatic installation part 200 includes the installation carter 210 movably provided along the traveling rail 201, the base 220 provided with the high voltage battery 20 which will be installed on the frame 10 for the electric vehicle, and a lifter 230 provided in the installation carter 210 and connected to the base 220 to lift the base 220.

Meanwhile, the conveyor 202 may be connected to the traveling rail 201 to convey the high voltage battery 20 to the base 220.

In this case, the conveyor 202 is also formed on an upper surface of the base 220 to easily move the high voltage battery 20.

The traveling rail 201 and the conveyor 202 are connected to each other in the ⊓-letter circulating structure, and thus the installation carter 210 may move forward and backward along the traveling rail 201 and the conveyor 202 may move along ⊏-letter shape.

In this case, the conveyor 202 and the traveling rail 201 may be circulated to continuously convey the high voltage battery 20 to the base 220, and the high voltage battery 20 moves along the installation carter 210 after being conveyed and thus the operation of conveying the high voltage battery 20 may be prepared at an initial position.

Figure 4:
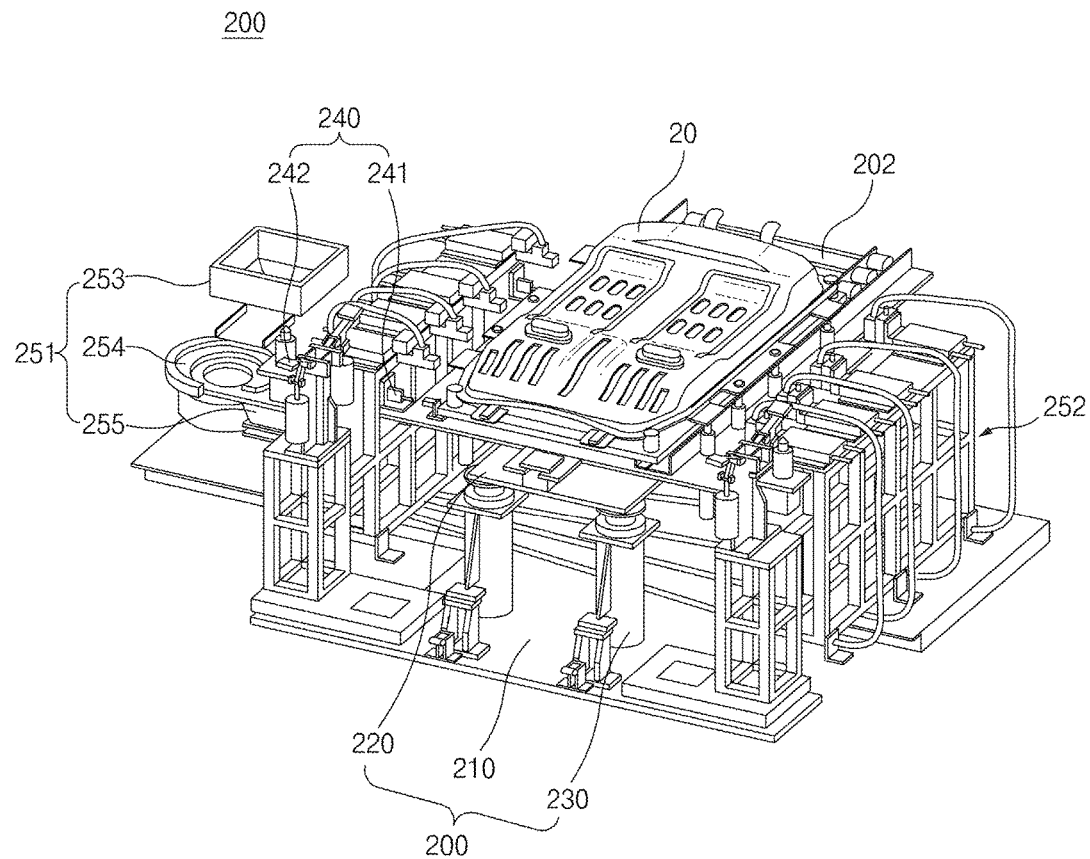
FIG. 4 is a diagram illustrating the automatic installation part of the automatic installation system of a high voltage battery for an electric vehicle and the device thereof according to the exemplary embodiment of the present disclosure.
Figure 5:
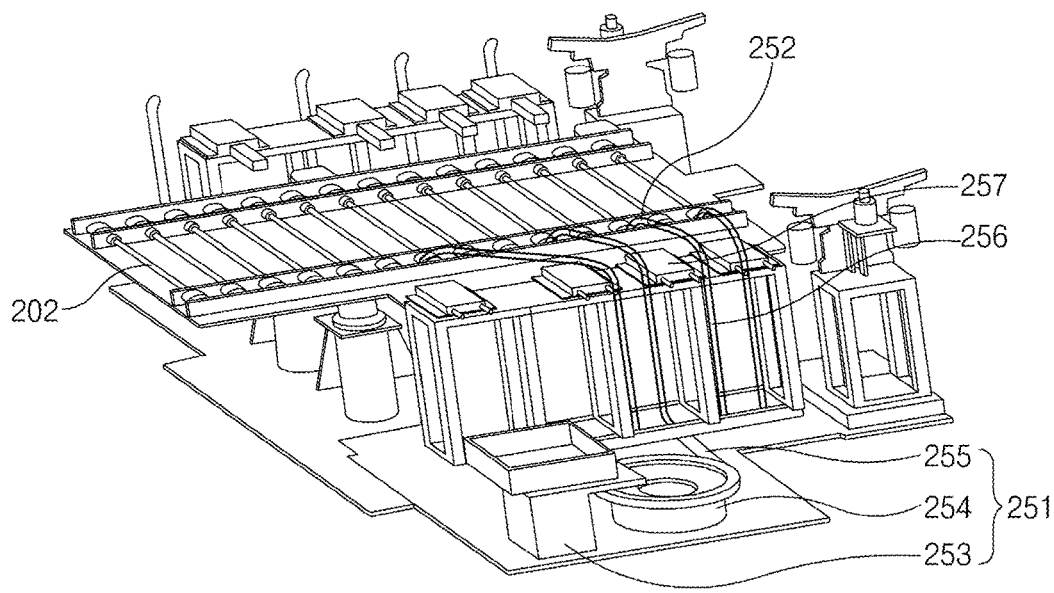
FIG. 5 is a diagram illustrating a feeding part and a bolt runner part of the automatic installation device of a high voltage battery for an electric vehicle according to the exemplary embodiment of the present disclosure.
Figure 6:
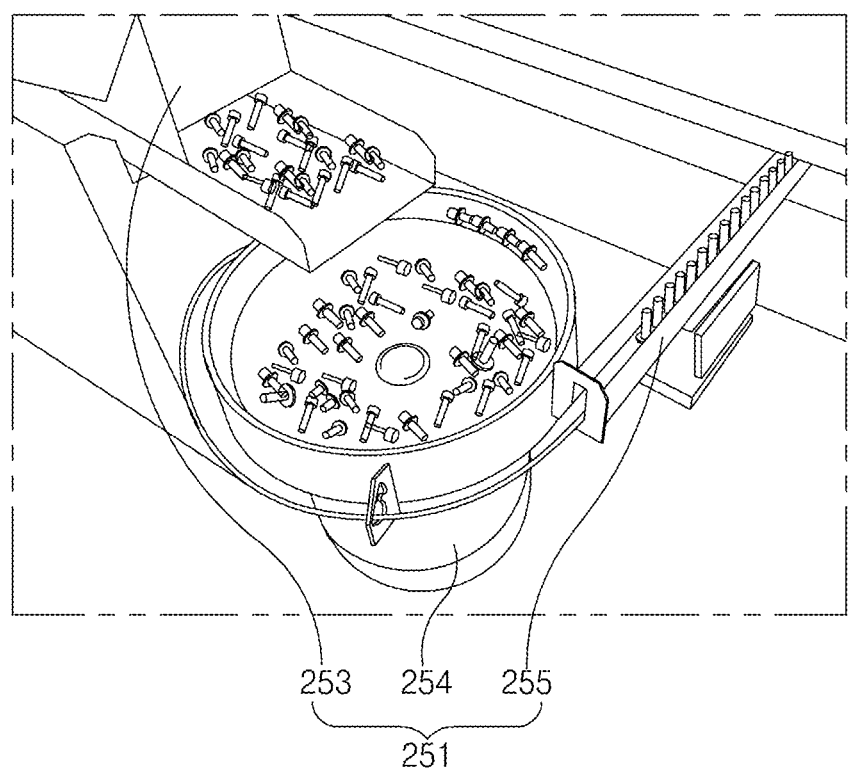
FIG. 6 is a diagram illustrating the feeding part of the automatic installation device of a high voltage battery for an electric vehicle according to the exemplary embodiment of the present disclosure.

As illustrated in FIGS. 3 and 4, the automatic installation part 200 further includes a centering part 240 which sets a position at which the high voltage battery 20 is fixed to the frame 10 for the electric vehicle to determine the fastening position of the frame 10 for the electric vehicle with the high voltage battery 20 before the high voltage battery 20 is fixed to the frame 10 for the electric vehicle.

Further, the automatic installation part 200 further includes a fastening part 250 which automatically installs the high voltage battery 20 on the frame 10 for the electric vehicle to automatically fasten the high voltage battery 20 by the bolt in the state in which the fastened position of the frame 10 for the electric vehicle with the high voltage battery 20 is determined by the centering part 240, thereby fastening the frame 10 for the electric vehicle with the high voltage battery 20.

In this case, the fastening part 250 includes a member supplying the bolt to the frame 10 for the electric vehicle and a member which actually performs the bolt fastening.

As illustrated in FIGS. 3 to 6, a feeding part 251 supplies a bolt to install the high voltage battery 20 on the frame 10 for the electric vehicle, and a bolt runner part 252 which actually performs the bolt fastening is provided and connected to the feeding part 251 and an end thereof is positioned at the base 220 to automatically install the high voltage battery 20 on the frame 10 for the electric vehicle.

Meanwhile, the centering part 240 includes a centering cylinder 241 which sets fixed positions for left and right directions of the high voltage battery 20 and the frame 10 for the electric vehicle, and a centering clamp 242 which sets fixed positions for front and back directions of the high voltage battery 20 and the frame 10 and thus may set the fixed or fastened positions for the front and back directions and the left and right directions of the high voltage battery 20 and the frame 10 before the high voltage battery 20 and the frame 10 for the electric vehicle are fastened to each other.

Further, the feeding part 251 may include a hopper 253 in which bolts are stored, a bowl 254 provided at one end of the hopper 253 to align the stored bolts, and a transfer device 255 conveying the bolts aligned while being provided in the bowl 254 to the bolt runner part 252.

In this case, the transfer device 255 includes a supply hose 256 supplying the bolts to the bolt runner part 252.

Further, the bolt runner part 252 includes a feeder 257 which is prepared for the fastening by the bolts supplied through the supply hose 256.

The present disclosure includes: the hanger part 100 hanging the frame 10 for the electric vehicle, and the automatic installation part 200 provided under the hanger part 100 to automatically center the high voltage battery 20 on the frame 10 for the electric vehicle and then install the high voltage battery 20. The centering part 240 is provided in the automatic installation part 200 and includes the centering cylinder 241 which sets the fixed positions for the left and right directions of the high voltage battery 20 and the frame 10. The centering clamp 242 sets the fixed positions for the front and back directions so as to set a position at which the high voltage battery 20 is fixed to the frame 10 for the electric vehicle, and the fastening part 250 includes a plurality of bolt runner parts 252 which are connected to the feeding part 251 supplying the bolt to install the high voltage battery 20 on the frame 10 and have ends positioned at the base 220 to automatically install the high voltage battery 20 on the frame 10 for the electric vehicle. As a result, it is possible to improve the workability by removing the inconvenience of process due to the manual work by automatically installing the high voltage battery 20 on the frame 10 for the electric vehicle and save costs by improving the accuracy and safety and reducing the labor costs due to the implementation of automation.

Figure 7:
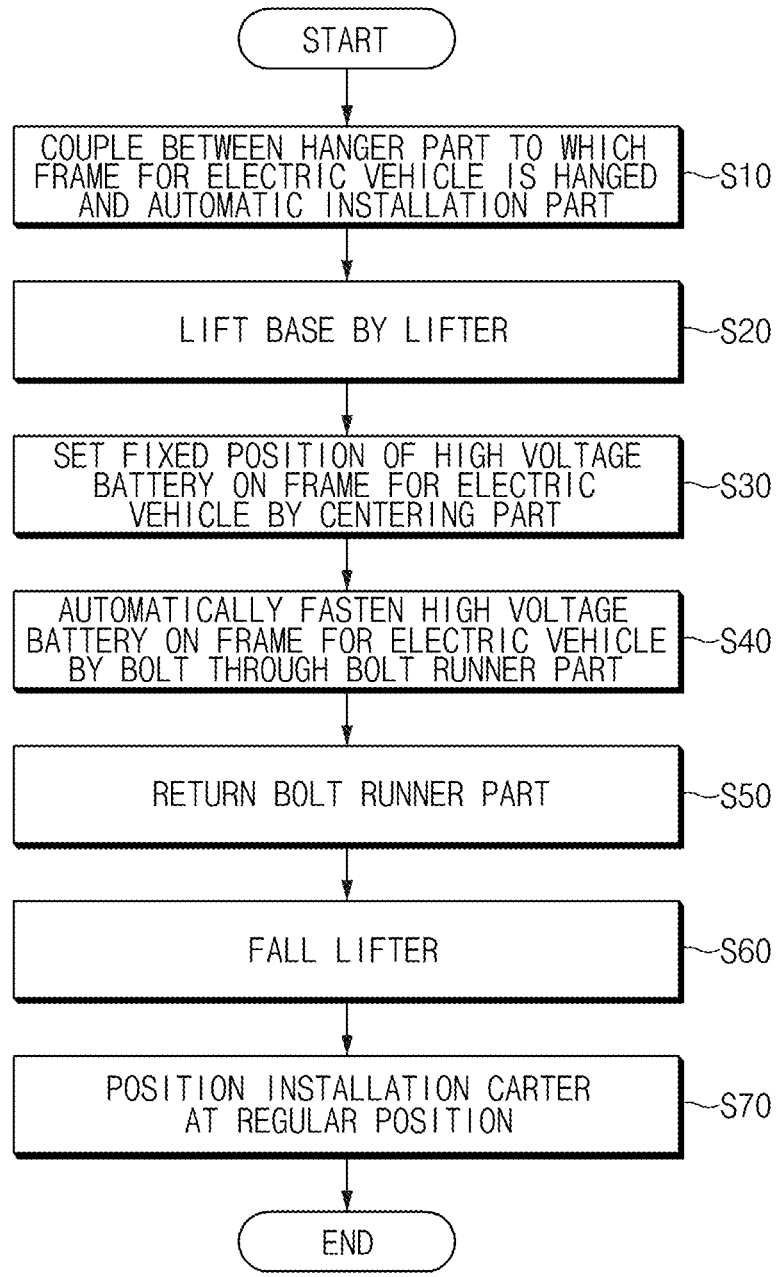
FIG. 7 is a flow chart illustrating an automatic installation method of a high voltage battery for an electric vehicle according to an exemplary embodiment of the present disclosure.

As illustrated in FIG. 7, an automatic installation method of a high voltage battery for an electric vehicle according to one form of the present disclosure provides an automatic installation of a high voltage battery 20 on the frame 10 for the electric vehicle. The method includes: a first step (S10) of coupling the hanger part 100 to the automatic installation part 200, a second step (S20) of lifting the base 220 by the lifter 230, a third step (S30) of automatically setting the fixed position of the high voltage battery 20 on the frame 10 by the centering part 240, and a fourth step S4 of automatically fastening the high voltage battery 20 on the frame 10 by the bolt.

The first step (S10) is a step of coupling the automatic installation part 200 to the hanger part 100 to which the frame 10 is hanged.

After the hanger part 100 is coupled with the automatic installation part 200 in the first step (S10), in the second step (S20), the base 220 in which the high voltage battery 20 is provided is lifted through the lifter 230 provided in the automatic installation part 200.

In the state in which in the second step (S20), the base 220 is lifted by the lifter 230, in the third step (S30), the position at which the high voltage battery 20 is fixed to the frame 10 for the electric vehicle by the centering part 240 provided in the automatic installation part 200 is set.

The fourth step (S40) is a step of performing the automatic fastening after the fixed position is set in the third step (S30) and the high voltage battery 20 is automatically fastened on the frame 10 for the electric vehicle by the bolt through the bolt runner part 252 of the fastening part 250 provided in the automatic installation part 200.

In this case, the automatic installation method of a high voltage battery for an electric vehicle further includes a fifth step (S50) of returning the bolt runner part 252 after the fastening by the bolt in the fourth step (S40), a sixth step (S60) of falling the lifter 230 after the fifth step (S50), and a seventh step (S70) of moving the installation carter 210 provided with the base 220 backward to complete the automatic installation and then positioning the installation carter 210 at the regular position to supply the bolt to the bolt runner part 252 so as to prepare for the subsequent process, after the sixth step (S60).

As such, the present disclosure includes the first step (S10) of coupling the hanger part 100 to which the frame 10 for the electric vehicle is hanged and the automatic installation part 200 through the hanger part 100 hanging the frame 10 for the electric vehicle and the automatic installation part 200 provided under the hanger part 100 to automatically center the high voltage battery 20 on the frame 10 for the electric vehicle and then install the high voltage battery 20, the second step (S20) of lifting the base 220 provided with the high voltage battery 20 by the lifter 230 provided in the automatic installation part 200, the third step (S30) of setting the position at which the high voltage battery 20 is fixed on the frame 10 for the electric vehicle by the centering part 240 provided in the automatic installation part 200, and the fourth step (S40) of fastening the high voltage battery 20 on the frame 10 for the electric vehicle by the bolt through the bolt runner part 252 of the fastening part 250 provided in the automatic installation part 200 after the setting of the fixed position in the third step (S30). As a result, it is possible to improve the workability by removing the inconvenience of process due to the manual work by automatically installing the high voltage battery 20 on the frame 10 for the electric vehicle and save costs by improving the accuracy and safety and reducing the labor costs due to the implementation of automation.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. An automatic installation device of a high voltage battery for a vehicle, comprising:
   a hanger part configured to hang and transfer a frame of the vehicle; and
   an automatic installation part configured to engage the high voltage battery to the frame, and configured to move along a traveling rail which defines a circulation path for the high voltage battery with a conveyor supporting and transferring the high voltage battery,
   wherein the hanger part is configured to move along a transfer rail positioned over the traveling rail and configured to transfer the frame to an upper side of the automatic installation part, and
   wherein the automatic installation part is configured to lift the high voltage battery transferred from the conveyor up to the frame when transferred to the upper side of the automatic installation part such that the high voltage battery is engaged with the frame.

2. The automatic installation device according to claim 1, wherein the automatic installation part comprises:
   an installation carter configured to move along the traveling rail;
   a base configured to receive the high voltage battery; and
   a lifter provided in the installation carter and connected to the base to lift the base.

3. The automatic installation device according to claim 2, further comprising a centering part configured to set a position at which the high voltage battery is fixed to the frame for the vehicle.

4. The automatic installation device according to claim 3, wherein the automatic installation part further comprises a fastening part by which the high voltage battery is automatically installed on the frame.

5. The automatic installation device according to claim 4, wherein the fastening part comprises:
   a feeding part configured to supply a bolt to install the high voltage battery on the frame; and
   a plurality of bolt runner parts configured to be connected to the feeding part and having ends positioned at the base to automatically install the high voltage battery on the frame for the vehicle.

6. The automatic installation device according to claim 5, wherein the centering part comprises:
   a centering cylinder configured to set fixed positions for left and right directions of the high voltage battery and the frame for the vehicle; and
   a centering clamp configured to set fixed positions for front and back directions of the high voltage battery and the frame for the vehicle.

7. The automatic installation device according to claim 5, wherein the feeding part comprises:
   a hopper configured to store the bolt;
   a bowl provided at an end of the hopper to align the stored bolt; and
   a transfer device provided in the bowl to convey the aligned bolt.

8. The automatic installation device according to claim 7, wherein the transfer device includes a supply hose supplying the bolt to the bolt runner parts.

9. The automatic installation device according to claim 8, wherein the bolt runner parts comprise a feeder configured to prepare the bolt to be fastened and the bolt supplied through the supply hose.

10. The automatic installation device according to claim 2, wherein the traveling rail is connected to the conveyor conveying the high voltage battery to the base.

11. The automatic installation device according to claim 10, wherein the traveling rail and the conveyor are connected to each other to form a square shape as a whole.

12. The automatic installation device according to claim 11, wherein the conveyor and the traveling rail are circulated.

13. An automatic installation system of a high voltage battery for a vehicle, comprising:
   a conveyor configured to support and transfer the high voltage battery;
   a hanger part configured to hang and transfer a frame of the vehicle; and
   an automatic installation part configured to engage the high voltage battery to the frame, and configured to move along a traveling rail which defines a circulation path for the high voltage battery with the conveyor,
   wherein the hanger part is configured to move along a transfer rail positioned over the traveling rail and configured to transfer the frame to an upper side of the automatic installation part, and
   wherein the automatic installation part is configured to lift the high voltage battery transferred from the conveyor up to the frame when transferred to the upper side of the automatic installation part such that the high voltage battery is engaged with the frame.

14. The automatic installation system according to claim 13, wherein the automatic installation part comprises:
- an installation carter configured to move along the traveling rail; and
- a base arranged over the installation carter and configured to receive the high voltage battery from the conveyor.

15. An automatic installation device of a high voltage battery for a vehicle, comprising:
- a hanger part configured to hang and transfer a frame of the vehicle;
- an automatic installation part configured to engage the high voltage battery to the frame and configured to move along a traveling rail which defines a circulation path for the high voltage battery with a conveyor supporting and transferring the high voltage battery;
- a centering part arranged in the automatic installation part, the centering part comprising: a centering cylinder setting fixed positions for left and right directions of the high voltage battery and the frame, and
  a centering clamp setting fixed position for front and back directions so as to set a position at which the high voltage battery is fixed to the frame; and
- a fastening part comprising a feeding part configured to supply a bolt to install the high voltage battery on the frame, and a plurality of bolt runner parts configured to be connected to the feeding part and have ends positioned at the base to automatically install the high voltage battery on the frame, wherein the hanger part is configured to move along a transfer rail positioned over the traveling rail and configured to transfer the frame to an upper side of the automatic installation part, and wherein the automatic installation part is configured to lift the high voltage battery transferred from the conveyor up to the frame when transferred to the upper side of the automatic installation part such that the high voltage battery is engaged with the frame.

* * * * *